UNITED STATES PATENT OFFICE.

ALBERT BARNES MOSES, OF SEATTLE, WASHINGTON.

PROCESS OF MAKING A SUBSTITUTE FOR MILK.

1,332,562.  Specification of Letters Patent.  Patented Mar. 2, 1920.

No Drawing.   Application filed May 19, 1919. Serial No. 298,327.

*To all whom it may concern:*

Be it known that I, ALBERT BARNES MOSES, a citizen of the United States, residing at Seattle, in the county of King and State of Washington, have invented a certain new and useful Improvement in Processes of Making a Substitute for Milk, of which the following is a specification.

My invention relates to improvements in the process of making a substitute for milk from soya-beans, peanuts and other seeds of albuminous plants and other nuts or any mixture of such beans, seeds or nuts and the object of my invention is to provide a substitute for milk which shall be free from any discoloration and wherein the undesirable taste of the soya-bean or nuts is eliminated.

A still further object is to provide a substitute for milk which shall contain the vitamins now deemed a necessary ingredient for infant food.

With the above and other objects in view I accomplish my invention by the following process:

After washing and removing the outer coating or skin the soya-beans are dried then ground into a flour or meal, which flour or meal is heated to a degree whereby it becomes very slightly brown in color.

To an amount of water (equal to about eight times the weight of the flour, heated to about 120 degrees Fahrenheit and containing salts in kind and quantity corresponding to the average amount of salts contained in cow's milk) is gradually added the flour or meal and thoroughly stirred, the water being maintained at a temperature of about 120 degrees Fahrenheit for about an hour whereupon the temperature of the mixture is gradually brought to about 160 degrees Fahrenheit whereupon it is mixed for a period of about half an hour.

The liquid is then carefully filtered into a suitable container where is is heated to about 200 degrees Fahrenheit for a short period of time. The liquid at this point becomes dark in color which color is caused by the heat. If the milk is condensed, canned and sterilized when completed by any former processes it becomes more darkened making it very undesirable for use.

The following steps taken in my process eliminate this undesirable feature and produces a product that is white and very desirable.

During the last named heating of the mixture I preferably add an amount of filtercel, or fullers' earth or other earths, the quantity depending upon the amount of solids in the solution, to remove the discoloration but said discoloration may be removed by filtering the heated mixture through charcoal or by the oxidation of the liquid by the introduction of ozone or other forms of concentrated oxygen.

The mixture is then carefully filtered and separated by an ordinary milk separator for the purpose of removing any precipitates or any distasteful oils.

If the mixture be made of any of the above seeds whose oils are not distasteful and are desirable to retain they may be made separately and the separator process omitted in which case any of the precipitates may be removed by the settling process.

The solids contained in the mixture are calculated in the usual manner and vegetable fats and sugar are added in proportions to correspond to that of average cow's milk or they may be added in any other proportion desired, or in place of the vegetable fats there may be added refined animal fats or other sources of vitamins to supply the vitamins of animal milk. It has been found that the addition of vitamins supply the necessary ingredient for infant diet.

Flavor may then be added in kind and quantity to meet the individual taste whereupon the mixture is thoroughly mixed by passing it through an homogenizer.

If the water contained in the mixture has been carefully regulated throughout my process it will not be necessary to condense it in an evaporating pan but if it has not been regulated the mixture may be passed through a condenser and reduced to a consistency of condensed milk or it may be reduced to any other desired consistency or it may be reduced to a powdered form.

The flavor added may be regulated either by the addition of *Lactis bacillus* or other cultures or preferably by the addition of a given percentage of a previous supply of this milk already heated with culture. The amount of flavor to be added depending upon the acidity of the original milk and the acidity desired in the finished product.

I have found in making this product by my process in commercial quantities that the above described process produces a substitute for milk which has the appearance and flavor of cow's milk.

Obviously changes may be made in the precise quantities of the ingredients used and in the temperature of heat used in my process without departing from the spirit thereof.

What I claim is:

1. In a process of manufacturing a substitute for milk from flour derived from the seed of leguminous plants, the steps consisting of the mixing of flour with water, heating the mixture at approximately 160° F., filtering said mixture and raising the temperature of the filtered solution substantially to a boiling point for the purpose of precipitating such portion of the albumins as are subject to fractional precipitation thereby.

2. In a process of manufacturing a substitute for milk from flour derived from the seed of leguminous plants, the steps consisting of the mixing of flour with water, heating the mixture at approximately 160° F., filtering said mixture and raising the temperature of the filtered solution substantially to a boiling point for the purpose of precipitating such portion of the albumins as are subject to fractional precipitation thereby, and adding a decolorizing agent to the solution before and after filtration.

3. In a process of manufacturing a substitute for milk from flour derived from the seed of leguminous plants, the steps consisting of the mixing of flour with water, heating the mixture at approximately 160° F., filtering said mixture and raising the temperature of the filtered solution substantially to a boiling point for the purpose of precipitating such portion of the albumins as are subject to fractional precipitation thereby, adding a decolorizing agent to the solution before and after filtration, separating the free oily and solid matters held in suspension in said solution and then adding vegetable fats in quantities to approximate the amount of fats contained in cow's milk.

4. In a process of manufacturing a substitute for milk from flour derived from the seed of leguminous plants, the steps consisting of the mixing of flour with water, heating the mixture at approximately 160° F., filtering said mixture and raising the temperature of the filtered solution substantially to a boiling point for the purpose of precipitating such portion of the albumins as are subject to fractional precipitation thereby, and adding a decolorizing agent to the solution before and after filtration, separating the free oily and solid matters held in suspension in said solution and then adding fats in variable quantities for purposes of varying the consistency of the milk as desired.

In witness whereof, I hereunto subscribe my name this 8th day of May A. D. 1919.

ALBERT BARNES MOSES.